Sept. 15, 1931.  B. H. SMITH  1,823,221
CALL AND DISMISSAL APPARATUS
Filed Oct. 13, 1927  4 Sheets-Sheet 1
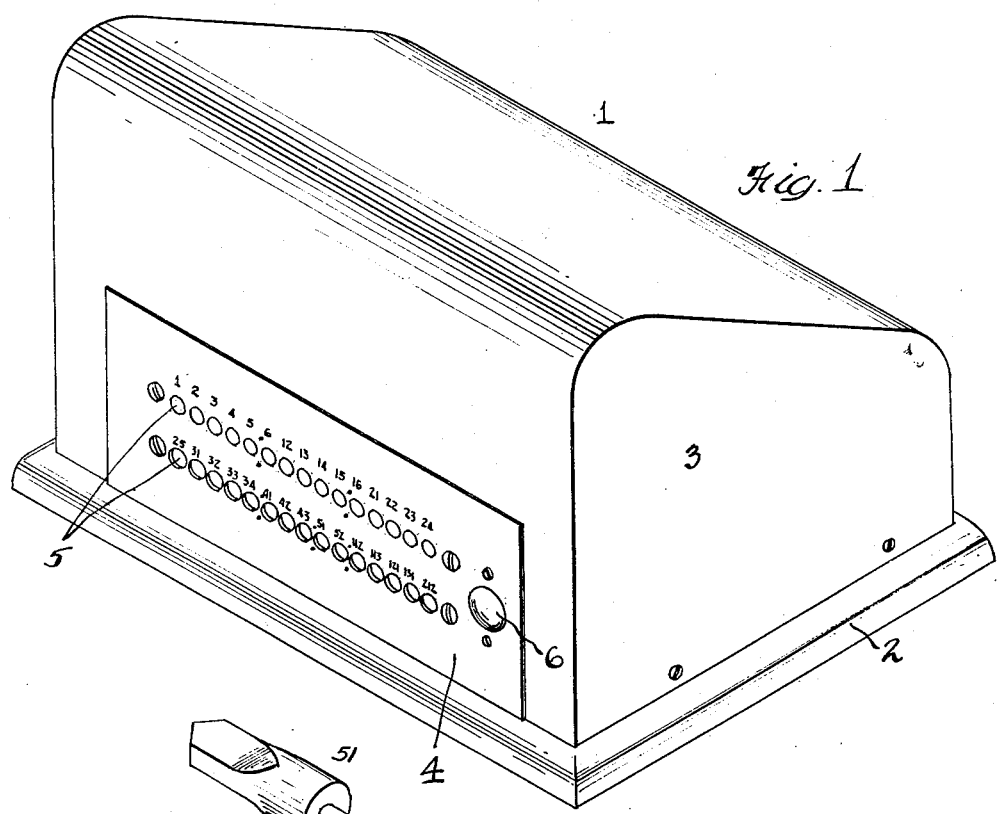
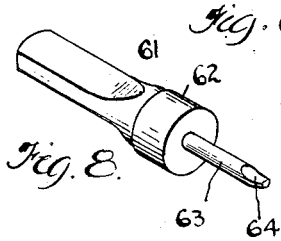
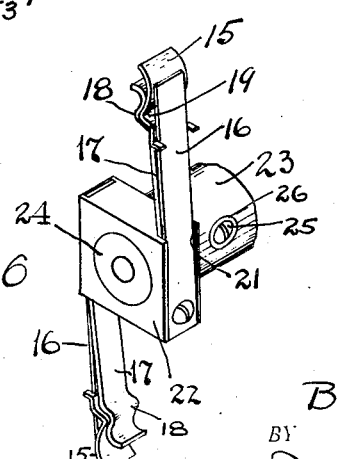

Sept. 15, 1931.  B. H. SMITH  1,823,221
CALL AND DISMISSAL APPARATUS
Filed Oct. 13, 1927  4 Sheets-Sheet 2

INVENTOR.
Boyd H. Smith
BY
Fay, Oberlin & Fay
ATTORNEYS.

Sept. 15, 1931.   B. H. SMITH   1,823,221
CALL AND DISMISSAL APPARATUS
Filed Oct. 13, 1927    4 Sheets-Sheet 3

INVENTOR.
Boyd H. Smith.
BY
Fay, Oberlin & Fay
ATTORNEYS.

Sept. 15, 1931. B. H. SMITH 1,823,221
CALL AND DISMISSAL APPARATUS
Filed Oct. 13, 1927 4 Sheets-Sheet 4
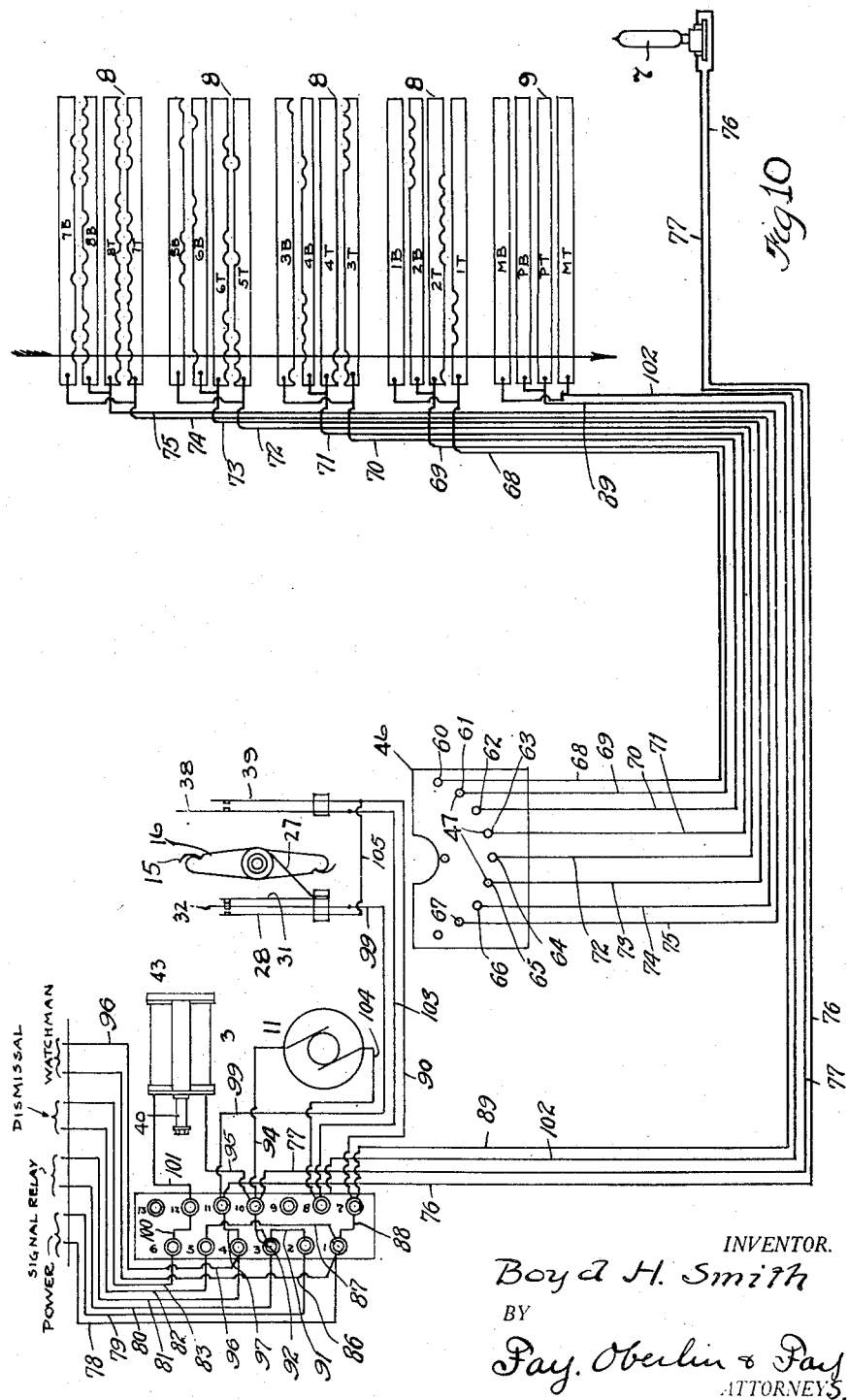
INVENTOR.
Boyd H. Smith
BY
Fay, Oberlin & Fay
ATTORNEYS.

Patented Sept. 15, 1931

1,823,221

UNITED STATES PATENT OFFICE

BOYD H. SMITH, OF SHELBY, OHIO, ASSIGNOR TO THE AUTOCALL COMPANY, OF SHELBY, OHIO, A CORPORATION OF OHIO

CALL AND DISMISSAL APPARATUS

Application filed October 13, 1927. Serial No. 225,897.

This invention as indicated relates to a call and dismissal apparatus. More particularly it comprises an apparatus adapted selectively to actuate distinctive signals at a plurality of points and to control the character and distribution of said signals through an actuating plug inserted in the switchboard of the apparatus in a particular position. It also includes a dismissal signal and means to prevent interference therewith. Devices of the general character indicated have heretofore been known and the present invention is an improvement upon that disclosed in the patents to George Thompson, No. 1,199,023 granted September 19, 1916, and No. 1,230,946 granted June 26, 1917. The present invention, however, embodies improvements in an apparatus of this character which render the same wholly automatic in action and of increased efficiency and adaptability in a wide variety of installations. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 2:
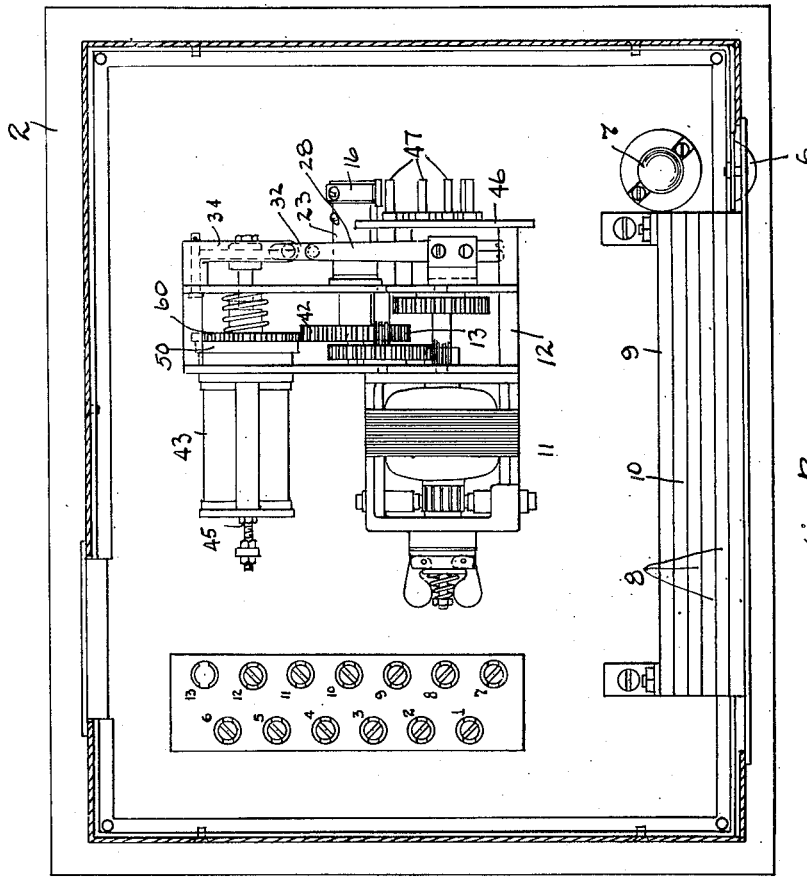
Figure 3:
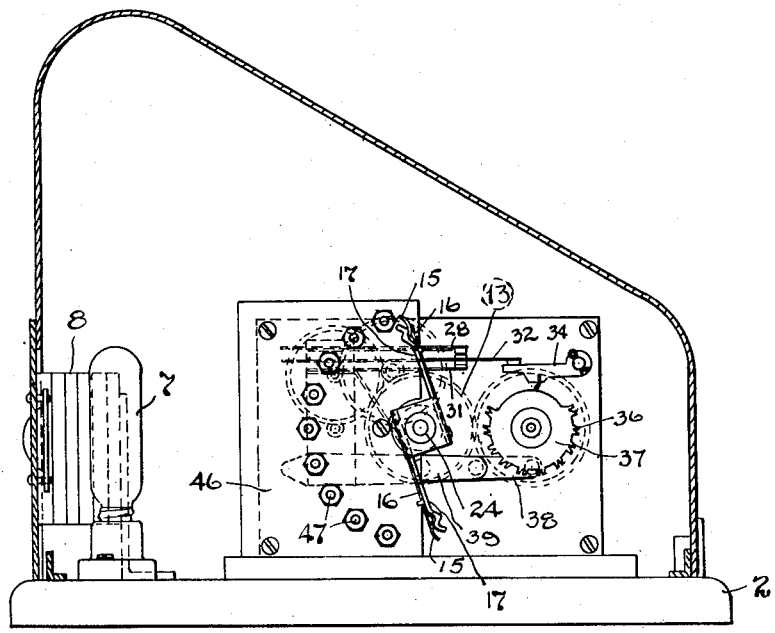
Figure 5:
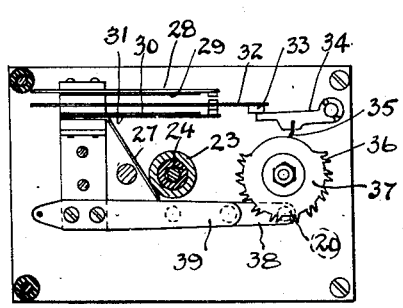
Figure 4:
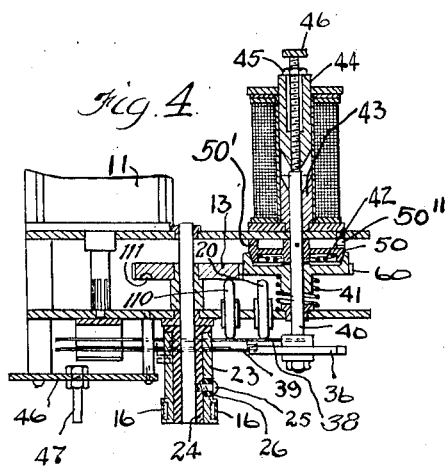

In said annexed drawings:

Fig. 1 is a perspective view of the call and dismissal device embodying the principles of my invention; Fig. 2 is a top plan view, with the cover removed, of the actuating mechanism of the call and dismissal; Fig. 3 is an end elevation of the apparatus shown in Fig. 2, the end portion of the cover being shown removed; Fig. 4 is a central horizontal sectional view showing the details of the dismissal mechanism; Fig. 5 is a detailed view partly in section showing the coding mechanism and contacts; Fig. 6 is an enlarged perspective view of an electric switch arm; Fig. 7 is a perspective view of one of the switch contact fingers; Fig. 8 is a perspective view of one of the operating plugs for the apparatus; Fig. 9 is a similar view of a modified form of operating plug; and Fig. 10 is a diagrammatic view showing a signal system provided with call and dismissal embodying the principles of the invention.

There is clearly shown in Fig. 1, a casing 1 having a base section 2 and a cover section 3, said cover section having a cut-out portion adjacent its lower face through which a switchboard panel 4 supported on said base is adapted to project. Said panel in the form illustrated is provided with a double row of contact sockets 5 to selectively receive a switch plug. Each of the sockets provides for a distinct series of circuit connections and is preferably individually numbered. The panel adjacent one end is provided with a bull's-eye 6 to permit a view of the pilot light 7 of the apparatus.

Immediately behind the panel a plurality of contact plates 8 are positioned. Said plates suitably insulated from each other are arranged in parallel groups and each group may comprise two or more upper and two or more lower operating plates. The plates as shown in Fig. 10 may be designated a plug board, and are formed with straight or notched edges in alignment with the several sockets to provide for the sending of a variety of signals as will be presently explained. The group of plates 9 farthest from the panel are not notched and comprise the motor switch plates which insure the operation of the motor when the series of circuit connections for the particular socket in use has already been completed. Between the plates 9 and the plates 8 an insulating guide plate 10 having round apertures is provided, said insulating plate serving to center the plug and prevent premature operation.

As is shown in Fig. 2 of the drawings, a small high speed electric motor 11, the details of which form no part of the present invention, is supported in a suitable frame 12 and serves through a gear train 13 to rotate a sector arm (see Fig. 6) having contact terminal plates or dogs 15 at each end. These contacts are preferably formed as is shown in detail in Figs. 6 and 7, and each comprises a rigid arm 17 formed of a metal strip and a spring finger 16 immediately in front of the same, said arm having a notch 18 adjacent its end adapted to engage a rib 19 formed on one of the contact terminal plates or dogs 15 to hold the same resiliently through engagement of the spring finger 16. The inner ends of the arm 17 and finger 16 are engaged in lateral groves 21 of a terminal block 22 mounted on the end of a sleeve 23 supported upon the shaft of the gear train 13. The sleeve is insulated from the shaft by means of a flanged tubular insulating member 24 and is held in position thereon by means of a set screw 25 engaged through an insulating collar 26. In this manner current from the sector arms will be transmitted through the circumferential contact sleeve through a contact arm brush 27 (Fig. 5) associated with the lower spring finger 31 of the dismissal contacts. These contacts as more particularly shown in Fig. 5 are supported above the sector shaft. The contacts comprise an upper contact member 28 supported by a suitable stiffener arm 29, a lower contact member 31 likewise supported by a suitable stiffener arm 30 and intermediate the two a middle contact member 32 of greater length than the others adapted to normally make contact with the lower contact arm and to be moved by means of the code wheel when it is actuated into contact with the upper contact arm thereby breaking the circuit to the lower contact arm. The lower contact arm as has been indicated is connected by means of a brush with the sleeve supporting the sector arms. The intermediate contact arm carries an insulating block 33 at its outer end which bears upon a dismissal arm 34 pivoted at one end and having a finger 35 at its under side adapted to ride over the contact teeth 36 of the dismissal code wheel 37.

Set at right angles to the contacts first above described are the motor switch contacts. They are preferably supported upon the same support as the dismissal contacts and one of said contacts 38 is of greater length than the other contact 39. The longer one extends behind the dismissal code wheel and is moved into contact with the shorter contact 39 by an insulated plunger 20 extending through the movement plate and resting against the face of the clutch gear 60. The dismissal code wheel is supported upon the outer end of a dismissal shaft 40 which carries at an intermediate position a clutch cone 50 against which is held a clutch gear 60 by means of a spring 41. A lighter spring 42 is interposed between the clutch cone and clutch gear, the balance of the parts being such that the clutch gear normally rotates idly upon the adjacent drive gear of the gear train 13 with which it is in constant engagement. Cam faces 50' and 50'' on the rear of the clutch cone and on the plate at the rear thereof, respectively, serve to keep the clutch members in engagement for one revolution. The dismissal shaft at the end opposite the code wheel extends through a stationary magnet core 43 and is adjustably held with a slidable magnetic core 44, a lock nut 45 upon the adjusting screw 46 serving to maintain any desired adjustment.

Immediately in advance of the dismissal code wheel and the contacts of the dismissal and motor switch, an insulated sector plate 46 is supported carrying a series of contact pins 47. The contact pins are arranged in an arc about the supporting shaft for the sector arms in order that the sector arm contacts may be wiped across said pins as the shaft is rotated, thus forming successive contact with the pins. Said pins 47 are individually designated in Fig. 10 by the reference numerals 60, 61, 62, 63, 64, 65, 66 and 67.

The operating plug 61 consists of a handle portion 62 of insulating material and a blade portion 63 of conducting material. The blade is circular in section except at the outer end which is tapered to facilitate its introduction between the selector bars. The outer end is also cut away at one side so as to provide a flat face 64, the blade at this portion being of substantially semicircular cross-section. When the plug is inserted with a flat face in the vertical plane, the blade contacts with all unnotched bars. When the plug is turned to bring the flat face into a horizontal plane, the connection is broken between the power line and the motor, but the connection from the power line to the code selector bars in retained.

Another form of actuating means for the central station may be used, such as the plug 51 illustrated in Fig. 9 having a body portion 52 of insulating material and a stem 53 of conducting material, flattened upon opposite sides, so as to present a greater diameter when turned in one direction than when turned at right angles thereto. This construction permits said plug to be inserted in said socket with the stem or blade extending between the contacts thereof and making no contact with any of the bars until it is rotated to a position at right angles. This form of plug permits of the complete insertion of the plug between the bars before making contact and a simultaneous establishment of the contacts through the rotation of the plug.

As has been indicated, the apparatus as illustrated in Fig. 10 comprises a panel board having a series of notched bars 8 and also motor and power bars 9. The lower pair of bars are in the top section of the insulators and are represented by the bars marked 1T, 2T, etc., while the bars in the bottom section of insulators are represented by the bars marked 1B, 2B, etc. It will be seen that the bars 1T and 1B are interconnected and that a wire 68 connects said bars to the contact pins 60. Similarly the bars 2T and 2B are connected to each other and, by a wire 69, to the contact pin 61. In the same way, each pair of corresponding top and bottom bars is connected together, and the pairs 3, 4, 5, 6, 7 and 8 are respectively connected to the contact pins 62, 63, 64, 65, 66 and 67 by wires 70, 71, 72, 73, 74 and 75 respectively. The arrow represents the position of the metal operating plug when the code to be transmitted is that provided by the socket numbered 2. It will be noted that where the arrow crosses unnotched bars, the operating plug contacts with the bar, and that it does not contact with those bars which are notched in the line of the arrow. Thus the bars 1T and 2T are in contact with the operating plug as also are the motor bar MT and the power bar PT. The motor and power bars are placed at the rear of each section of insulators so that the other contacts will be made before the motor is energized. The unnotched bars marked B in the lower section of insulators, do not contact with the operating plug while it is in the upper or T section of insulators. Therefore the code selection is made from the power bar PT to the bars 1T and 2T and also to the motor bar MT. By inserting the operating plug in any aperture of the panel board, the corresponding code is selected on the bars.

When the operating plug 61 shown in Fig. 9 is inserted in the panel board and turned so as to bring the flat face into a vertical plane, the motor will be started and the apparatus will proceed to function. Once started by the operating plug, the motor switch, including the contacts 38 and 39, closes and the motor continues to run the mechanism for a complete revolution of the selector arm (see Figs. 3 and 6). If the operating plug has been inserted with the flat face in the vertical plane, and it is not thereafter turned, the motor will operate continuously. A code will be sent during each half revolution of the selector arm. When the operating plug is turned after being inserted with its flat face in a vertical plane so that the flat face is brought into a horizontal plane, the mechanism will revolve the selector arm for the full revolution, two codes being sent, and then the motor will stop with the opening of the switch contacts 38 and 39. Thus the apparatus provides for the sending of a limited call without the introduction of additional mechanism for this purpose.

The motor switch with the contacts 38 and 39 is in parallel connection with the power bars and motor bars in the panel board. The motor switch arm 38 is operated through the insulating plunger 110 riding on the face of the gear 13. A depression 111 in the face of the gear which coacts with the switch plunger end once in each revolution of the gear 13 allows the switch contact 38 to break contact with the contact 39 when the depression is so aligned with the plunger. As long as the operating plug has its flat face in a vertical plane, the power will be directly connected to the motor and the mechanism will continue to revolve over the period that the motor switch is open, but if the mechanism is started by the operating plug and the plug is then turned so that the flat face is brought into a horizontal plane, as explained above, the motor operates until two codes are sent and the motor then stops at the opening of the motor switch.

The selector pins 47, as indicated, are connected electrically with the selector bars 8 mounted on an insulating plate and each pin is connected to its corresponding selector bar. Thus pin 60 is connected to 1T and 1B and pin 61 is connected to 2T and 2B. When a bar is connected to the power bar by means of the plug, its corresponding pin is also connected. The double-ended revolving selector arm shown in detail in Fig. 6, serves to establish contacts with the selector pins through the dog 15 carried at the ends of the selector arms. As the dog passes the pins it snaps back to its normal position causing a break in the connection between the arm and the selector pin. Thus, for each contact between the dog 15 and an energized selector pin, an electrical impulse is transmitted through the dog 15 to the arm 18 and thence to the hub 23. A brush 27 sliding on the hub 23 conveys the current impulse to the three-way switch 31, 32, 28, the common central contact 32 of the switch connecting with the terminal numbered 11 in Fig. 10, of the drawings and thence to the signals. The pilot light connects to the terminal numbered 11 and to the opposite side of the power source, thus flashing the code as the impulses are transmitted.

When the code wheel 36 revolves and the teeth pass under the dismissal arm or rider 34, the contact arm 32 is raised out of contact with the contact arm 30 because of the greater radius of the tip of the code wheel teeth, and contact is made with the contact arm 28 which is connected to the power at the terminal block. Thus an impulse of current is transmitted through the contacts 28 and 32 to the terminal 11 and thus to the signals, for each tooth on the code wheel. As has been explained, the bottom of the teeth and the section between the teeth being of lesser radius than the top of the teeth, yet of greater radius than the uncoded section of the wheel, the dismissal arm or rider is allowed to rise and fall making and breaking the contact between the arms 32 and 28, but such operation does not reestablish contact between the contact 32 and the contact 30 until the uncoded section of the code wheel is reached, such uncoded section being of smaller radius.

Through the arrangement just described, the regular coding is interrupted while the dismissal code is being transmitted and the regular code is re-established at the completion of the dismissal code.

The power is supplied through conductors 78 and 79 to the terminals 1 and 2 in Fig. 10 of the drawings. The terminal numbered 1 has connected thereto three leads 86, 87 and 88, and these leads will be considered individually. The wire 86 constitutes one side of the watchman's circuit later to be discussed. The wire 87 connects the terminal 1 with the terminal 5 to which is connected the wire 82 constituting one side of an external dismissal circuit later to be discussed. The lead 88 connects the terminal 1 with the terminal 7 from which lead two conductors 89 and 90. The conductor 89 is connected to the top and bottom power bars 9, while the conductor 90 leads to the switch arm 39.

The terminal numbered 2 is connected by the conductor 91 to the terminal 3 from which lead two branches 80 and 92. The branch 80 constitutes one side of a signal relay later to be discussed, while the branch 92 connects the terminal 3 with the terminal 10 from which extend three leads 77, 94 and 95. The lead 77 constitutes one side of the energizing circuit for the pilot lamp 7, the lead 94 constitutes one side of the energizing circuit for the motor 11, and the lead 95 constitutes one side of the energizing circuit for the dismissal magnet 43.

Referring, now, to the watchman's circuit, it will be remembered that the wire 86 comprising one side thereof is connected to the power source through the terminal 1. A button, (not shown) is adapted to connect said wire with the wire 96 leading to the terminal 4, thus closing a circuit as follows: Power line 78, terminal 1, wire 86, watchman's button, wire 96, terminal 4, wire 97, terminal 11, wire 76, lamp 7, wire 77, terminal 10, wire 92, terminal 3, wire 91, terminal 2, and power line 79. Thus, if the plug 61 is not inserted in any one of the apertures in the panel, the bells of the system (not shown) are actuated and the lamp 7 is lighted, but otherwise the apparatus is undisturbed by the actuation of the watchman's button. It may here be noted that the signal relay, being connected to the terminals 10 and 11 of the central, will be actuated whenever said terminals are connected to power.

Referring now, to the dismissal circuit above mentioned, if it be presumed that the operating button (not shown) for said circuit is depressed at a time when no other button is depressed and when the plug 61 is not in any aperture in the panel 4, the circuit so established is as follows: power line 78, terminal 1, wire 87, terminal 5, wire 82, dismissal button, wire 83, terminal 6, wire 100, terminal 12, wire 101, dismissal magnet 43, wire 95, terminal 10, wire 92, terminal 3, wire 91, terminal 2 and power line 79. Thus, depression of the dismissal button at such a time as that suggested merely causes actuation of the magnet 43 to engage the clutch disk 50 frictionally with the clutch gear 60.

This movement, of course, shifts the pin 20 to move the contact on the arm 38 into engagement with the contact on the arm 39, thus establishing a circuit as follows: power line 79, terminal 2, wire 91, terminal 3, wire 92, terminal 10, wire 94, motor 11, wire 104, terminal 8, wire 103, arm 38, arm 39, wire 90, terminal 7, wire 88, terminal 1, and power line 78. The motor is thus energized to rotate the code wheel 37 to send a dismissal signal. After the clutch member has made one full revolution, it drops back into the position shown in Fig. 4, under the bias of the spring 42, thus permitting the arm 38 to shift the pin 20 and open the motor circuit.

Reference has been made to the connection of the power bars to the terminal 1. When the plug 61 is inserted in one of the panel apertures, it acts as a switch connecting one of the power bars with the corresponding one of the motors bars, and the following circuit is established: power line 78, terminal 1, wire 88, terminal 7, wire 89, power bar, plug 61, motor bar, wire 102, terminal 8, wire 104, motor 11, wire 94, terminal 10, wire 92, terminal 3, wire 91, terminal 2, and power line 79. As soon as the motor, which is thus energized begins to operate, rotation of the gear 13 forces the plunger 110 out of the recess 111 and thus causes said plunger to move the switch arm 38 into contact with the switch arm 39. Thereupon, of course, a parallel circuit is established as follows: power line 78, terminal 1, wire 88, terminal 7, wire 90, switch arm 39, switch arm 38, wire 103, terminal 8, wire 104, motor 11, wire 94, terminal 10, wire 92, terminal 3, wire 91, terminal 2 and power line 79. Thus it will be seen that, once the motor has been started, the plug 61 may be turned to break the circuit of which it is a part and the motor will still continue to operate until the gear 13 has completed one revolution, whereafter the plunger 110 will fall into the socket 111 to permit the arm 38 to move away from the arm 39, thus breaking the motor energizing circuit.

It has been stated that the wire 80 connected to the terminal 3 constitutes one side of a signal relay circuit. This circuit is adapted to be closed by a button (not shown) which is adapted to connect said wire 80 to the wire 81 leading to the terminal 4.

As the motor rotates the sector arms 16, the fingers 15 carried thereby are wiped across the pins 47. Presuming that the plug 61 is in contact with one or more of the code bars 8, say the bars 1T and 2T as indicated in Fig. 10, when a finger 15 strikes the pin 60, it will close a circuit as follows: power line 78, terminal 1, wire 88, terminal 7, wire 89, P T, plug 61, 1T, wire 68, pin 60, finger 15, arm 16, sleeve 23, brush 27, switch arm 31, switch arm 32, wire 99, terminal 11, wire 76, lamp 7, wire 77, terminal 10, wire 92, terminal 3, wire 91, terminal 2 and power line 79.

If the dismissal button (not shown) is depressed at such a time as that described above, the code wheel 37 begins to rotate as soon as the magnet 43 is energized. As the first tooth 36 on said code wheel strikes the finger 35 on the dismissal arm 34, said arm is elevated to move the switch arm 32 out of contact with the arm 31 and into contact with the arm 28. At this instant, there is so established a circuit as follows: power line 78, terminal 1, wire 88, terminal 7, wire 90, wire 105, switch arm 28, switch arm 32, wire 99, terminal 11, wire 76, lamp 7, wire 77, terminal 10, wire 92, terminal 3, wire 91, terminal 2 and power line 79. As the wheel 37 continues to rotate, the finger 35 will fall into the notch between the first two teeth, which, as it will be remembered, has a radius greater than that of the uncoded portion of said wheel, and will permit the switch arm 32 to move out of contact with the switch arm 28, while holding said switch arm 32 out of contact with the switch arm 31.

Briefly summarized, the operation is substantially as follows: The operating plug is inserted with its flat face in a vertical plane in an aperture corresponding to code numbered 2. When the plug is completely inserted, the motor will start. As soon as the motor starts, the switch contacts 38 and 39 close and the operating plug may then be turned through a right angle to effect a limited call or allowed to remain in the original position to effect a continuous call. When the dog 15 on the arm 18 contacts with an energized pin 47, an impulse is transmitted through the hub 23 and the brush 27 to the contact arm 31, and thence through the contact 32 to the terminal 11 and to the signals. If the operating plug is turned to bring its flat face into a horizontal plane, the code will be completed and the machine will stop with the revolving arm in proper position to start a new code, the motor switch keeping the motor connected until the starting position is reached. False calls which have heretofore been a difficulty in connection with apparatus of the character herein referred to, are eliminated by the mechanism described for the reasons that through using an operating plug of circular cross-section, and providing for the stopping of the motor only at the proper position to start a new code, a full signal must always be given. A partial code or false signals are thus effectively prevented.

The dismissal is operated by closing an external circuit. This is usually accomplished by means of a master clock or a push button. When so energized, the dismissal magnet operates the clutch and closes the motor switch, if it is not already closed, and starts the motor which revolves the code wheel, and cuts out the regular coding and transmits the dismissal code, and thereafter restores the original connections and permits the regular coding to be completed.

Other modes of applying the principle of my invention may be employed instead of the one explained, change being made as regards the mechanism herein disclosed, provided the means stated by any of the folowing claims or the equivalent of such stated means be employed.

I therefore particularly point out and distinctly claim as my invention:

1. In an apparatus of the character described, the combination of a switchboard provided with a plurality of conducting plates, arranged in parallel groups with sockets therebetween, a conducting plug for insertion selectively in said sockets in varying radial positions of contact to form predetermined circuit connections through certain of said plates, said plug having a portion of its contacting periphery cut away so as to eliminate certain contacts with said plates when in given varying radial positions, a motor, an energizing circuit for said motor, said plug being adapted to close said energizing circuit after making said predetermined circuit connections, and means operated by said motor for transmitting a predetermined signal in accordance with said circuit connections.

2. In an apparatus of the character described, the combination of a switchboard provided with a plurality of conducting plates arranged in parallel groups with sockets therebetween, a conducting plug for insertion selectively in said sockets in varying radial positions of contact to form predetermined circuit connections, a motor, an energizing circuit for said motor, a motor switch actuated by said plug, after making said predetermined circuit connections, to close said energizing circuit, said plug having a portion of its contacting periphery cut away so as to prevent actuation of said motor switch except when said plug is in a given radial position, signal means, and means actuated by said motor, for transmitting a given succession of impulses to said signal means in accordance with said predetermined circuit connections.

3. In an apparatus of the character described, the combination of a switchboard provided with a plurality of plates of conducting material arranged in parallel groups with sockets therebetween, a plug of conducting material for insertion selectively in said sockets to form predetermined circuit connections, a motor, an energizing circuit for said motor, a motor switch actuated by said plug after making said circuit connections, to close said circuit, signal means connected in said predetermined circuits, means actuated by said motor for selectively transmitting one of a plurality of signal means, means actuated by said motor for transmitting one of a plurality of different signals to said signal means depending upon said predetermined circuit connections, a dismissal mechanism comprising a code signal mechanism normally disconnected from said motor, a clutch for connecting the code signal mechanism to the motor, means for operating the clutch and for closing the circuit for the motor and means operated in the operation of said code signal mechanism for disconnecting the motor operated transmitting means from the signal means.

4. In an apparatus of the character described the combination of a switchboard provided with a plurality of plates of conducting material arranged in parallel groups with sockets therebetween, a plug of conducting material for insertion selectively in said sockets to form predetermined circuit connections, a motor, an energizing circuit for said motor, a motor switch actuated by said plug after making said circuit connections, to close said circuit, means actuated by said motor for selectively transmitting different series of signal impulses in accordance with said predetermined circuits, a gear train actuated by said motor, a code signalling apparatus, a normally disengaged clutch between said train and said code signalling apparatus, a solenoid for controlling said clutch, and means whereby the motor operated transmitting means is rendered ineffective during the operation of said code signalling apparatus.

5. In a device of the character described the combination of a switch board having a plurality of contacts adapted to provide for a variety of circuit connections, a series of common motor control contacts associated with each of said first-named contacts, a contact mechanism associated with said switchboard, a motor for driving said contact mechanism, additional mechanism including a code wheel normally declutched from said motor, contact mechanism mounted for cooperation with said code wheel, and means for clutching said motor to said code contact mechanism and for energizing said motor.

6. In a device of the character described the combination of a switch board having a plurality of contacts adapted to provide for a variety of circuit connections, a series of common motor control contacts associated with each of said first-named contacts, a contact mechanism associated with said switchboard, a motor for driving said contact mechanism, additional mechanism including a code wheel normally declutched from said motor, contact mechanism mounted for cooperation with said code wheel, and a dismissal solenoid for clutching said motor to said code contact mechanism and for energizing said motor, and means associated with said code wheel rendering inoperative said contact mechanism for said switchboard.

7. In a device of the character described the combination of a selective signalling mechanism and a dismissal code signalling mechanism, a motor, a gear train associated with said motor for driving each of said signalling mechanisms and independent means for controlling a portion of said gear train to render said code signalling mechanism operative and the circuit connections of said selective signalling mechanism inoperative.

8. In a device of the character described the combination of a selective signalling mechanism and a dismissal code signalling mechanism, a motor, a gear train associated with said motor for driving each of said signalling mechanisms and a dismissal solenoid for controlling a portion of said gear train to render said code signalling mechanism operative, and means cooperative with said code signalling mechanism, when operated, rendering the circuit connections of said selective signalling mechanism inoperative.

9. In a selective signalling apparatus the combination of a plurality of contact plates arranged in parallel groups and provided with spaces to receive an operating plug, one series of said plates being adapted to make contact, and another series of said plates being cut away to avoid contact with said plug along lines extending transversely thereof, and a plug having a cylindrical portion and a flattened end, said plug being adapted to engage between certain of said plates of said first series without establishing electrical contact therewith, while establishing contact with the remaining plates of said series in one angular position of said plug, and to engage all said plates of said first series to establish electrical contact in a position at right angles to said first position.

10. In a device of the character described, the combination of a switch-board having a plurality of contacts adapted to provide for a variety of circuit connections, a series of motor control contacts associated with each of said first-named contacts, a contact mechanism associated with said switchboard, a motor for driving said contact mechanism, additional mechanism including a code wheel normally declutched from said motor, contact mechanism mounted for cooperation with said code wheel, means for clutching said motor to said code contact mechanism and for energizing said motor, and means associated with said code wheel rendering inoperative said contact mechanism for said switchboard.

Signed by me this 8th day of October, 1927.

BOYD H. SMITH.